June 9, 1953    C. L. GARRISON    2,641,115
UNIVERSAL JOINT CONSTRUCTION
Filed March 12, 1949    3 Sheets-Sheet 1
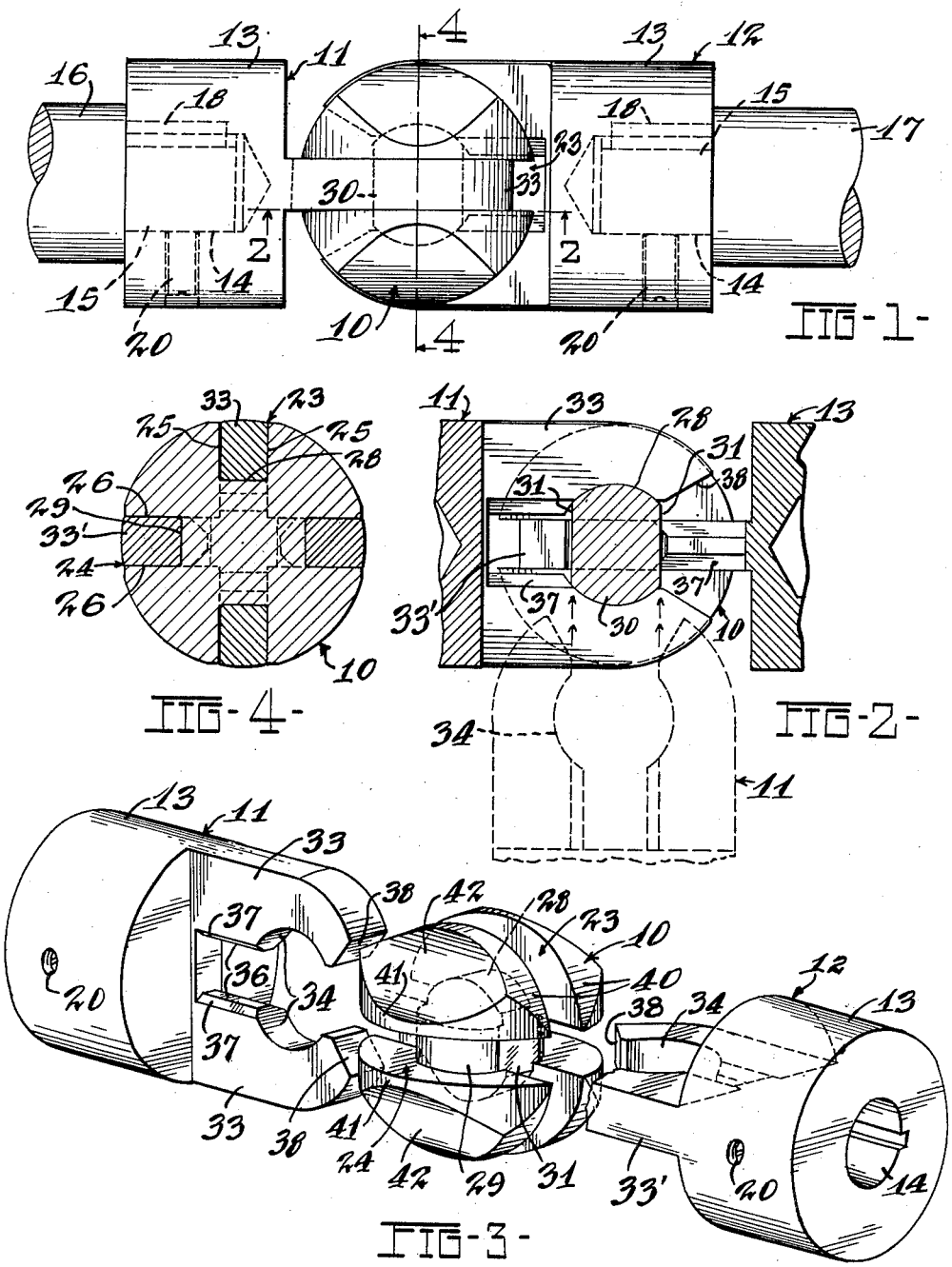
INVENTOR:
Clifford L. Garrison
BY
Harry O. Ernsberger
ATTY.

June 9, 1953  C. L. GARRISON  2,641,115
UNIVERSAL JOINT CONSTRUCTION
Filed March 12, 1949  3 Sheets-Sheet 2
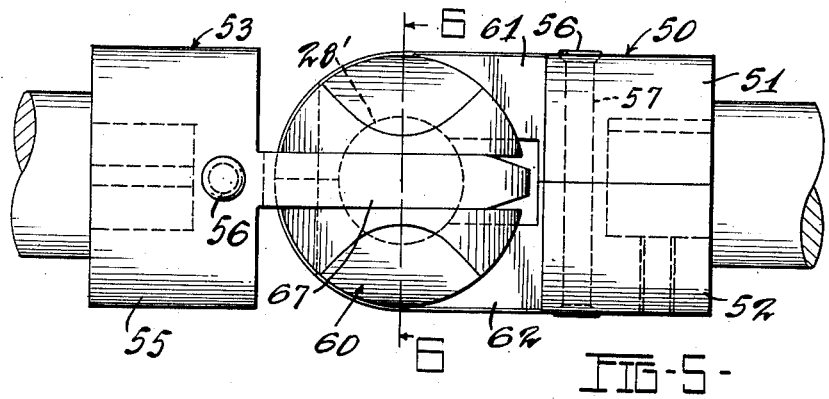
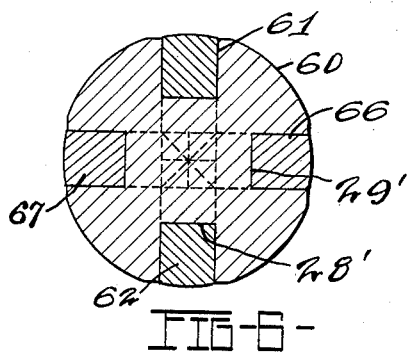
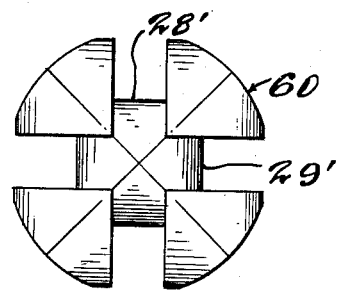
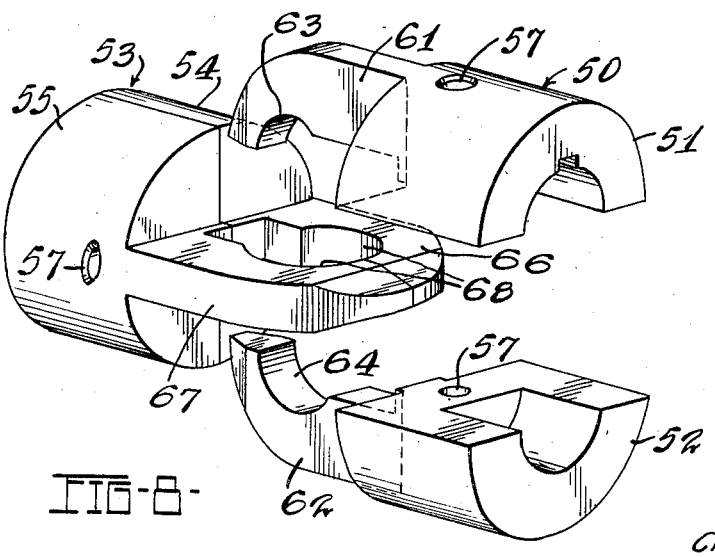
INVENTOR:
Clifford L. Garrison
BY
Harry O. Ernsberger
ATTY.

June 9, 1953   C. L. GARRISON   2,641,115
UNIVERSAL JOINT CONSTRUCTION
Filed March 12, 1949   3 Sheets-Sheet 3
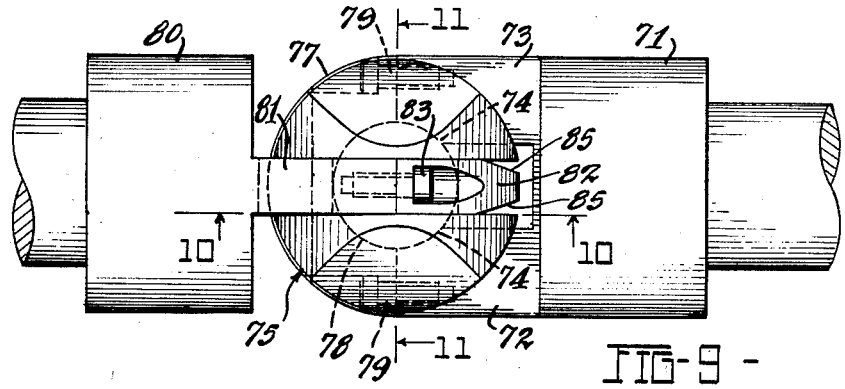
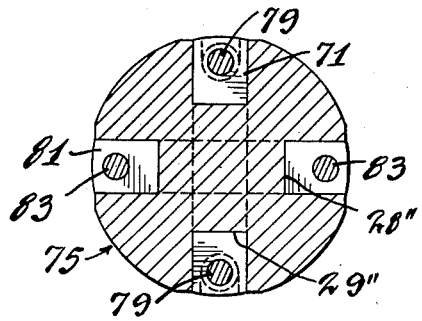
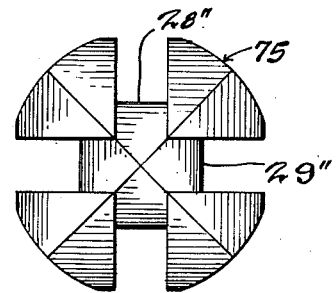
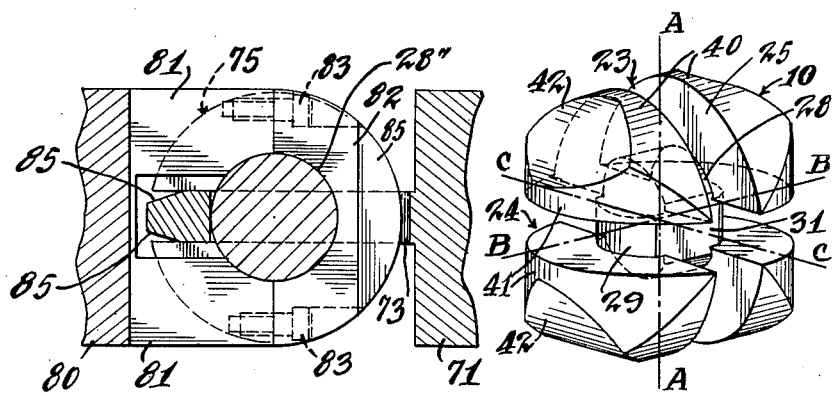
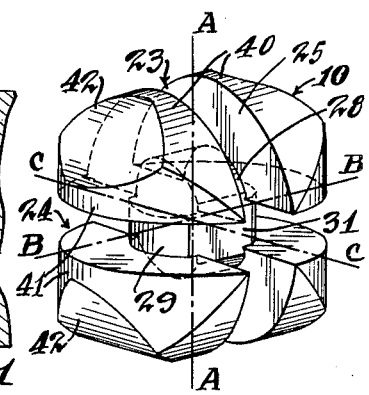
INVENTOR:
Clifford L. Garrison
BY
Harry O. Ernsberger
ATTY.

Patented June 9, 1953

2,641,115

UNITED STATES PATENT OFFICE 2,641,115

UNIVERSAL JOINT CONSTRUCTION

Clifford L. Garrison, Adrian, Mich., assignor to Oliver Instrument Company, Adrian, Mich., a corporation of Michigan Application March 12, 1949, Serial No. 81,071

1 Claim. (Cl. 64—16)

This invention relates to improvements in couplings for machine elements and more particularly to a universal type of coupling for power transmission mechanism wherein shafts or elements having intersecting axes are connected to transmit motion from one shaft or element to another.

The invention embraces the provision of a novel method and arrangement for assembling and operatively connecting the elements of a joint construction arrangement together in a manner whereby the assembly of the elements is such as to maintain the elements of the joint construction at all times in proper operative relation.

An object of the invention resides in a universal joint of a character wherein a central section or block is configurated so as to accommodate and retain the yoke elements in predetermined operative relationship without the use of additional securing means.

Another object of the invention is the provision of a universal joint construction and method of assembling the elements thereof wherein the furcations of the yoke elements and the bearing seats in the center member provide an interlocking construction that effectively prevents longitudinal displacement of the yoke elements with respect to the center member.

Another object of the invention resides in the provision of a universal joint wherein the center block or center section of the joint is adapted to be easily and quickly manufactured by conventional machine operations without the use of special machine tools and wherein the yokes are arranged for interlocking engagement with the center block in a manner whereby the yokes and center section or block are maintained in operative relation.

Another object of the invention resides in the provision of a universal joint construction employing a center yoke connecting section wherein the section and the arms of the yoke constructions present large bearing surfaces whereby wear of the engaging surfaces of the joint is reduced to a minimum.

Still a further object of the invention resides in the provision of a universal joint construction of simplified arrangement wherein the elements may be fabricated in mass quantities by conventional machine methods wherein the cost of producing a universal joint is greatly reduced.

Still another object is the provision of a universal joint wherein the rotation of one of the yokes of the joint is transmitted to the other yoke at a more nearly uniform or constant velocity than has been attained with universal joints of conventional construction.

Still a further object of the invention resides in the provision of a simple yet effective universal coupling which may be quickly and accurately produced and which in assembly and use eliminates lost motion between the driving and driven parts, thus rendering the joint construction particularly adaptable for utility in precision machines.

Another object of the invention resides in a method of assembling the yokes of a coupling construction to a center section wherein the assembly may be made without special tools by angularly interlocking the elements together whereby the construction of the yokes and center section hold the parts in assembled relation during normal position of use.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view illustrating one form of universal coupling of my invention in assembled condition;

Figure 2 is a sectional view taken substantially on the line 2—2 of Figure 1 illustrating the method of assembly of a yoke with the center block;

Figure 3 is a view illustrating the yokes and center block in disassembled relation;

Figure 4 is transverse sectional view taken substantially on the line 4—4 of Figure 1;

Figure 5 is a view similar to Figure 1 showing a modified form of the invention;

Figure 6 is a vertical sectional view taken substantially on the line 6—6 of Figure 5;

Figure 7 is a view of the block section forming an element of the construction shown in Figure 5;

Figure 8 is an isometric view illustrating the yoke elements in disassembled condition;

Figure 9 is a view similar to Figure 5 showing a further modification of the invention;

Figure 10 is a longitudinal sectional view taken substantially on the line 10—10 of Figure 9;

Figure 11 is a transverse sectional view taken substantially on the line 11—11 of Figure 9;

Figure 12 is an elevational view of the center block forming an element of this form of the invention, and Figure 13 is an angular view of the center block forming an element of the form of the invention shown in Figures 1 through 4.

Referring to the drawings in detail, and first with respect to the form of the invention shown in Figures 1 through 4 inclusive, the structure embodies a center section or block 10 and yokes or yoke elements 11 and 12. As illustrated the shank or body portions 13 of the yokes 11 and 12 may be bored as at 14 to accommodate tenons 15 formed respectively on shafts or elements 16 and 17, the shafts being coupled together for movement about their individual axes through the medium of the joint construction formed by elements 10, 11 and 12. The enlarged portions 13 may be provided with keyways 18 to accommodate feather keys to prevent relative rotation between the yokes and the shafts associated therewith. Set screws 20 may be additionally employed to fixedly secure the shafts to the yokes 11 and 12.

The center block or section 10 of the joint construction is machined or fashioned with peripheral slots or grooves 23 and 24 which are arranged 90 degrees apart as clearly shown in Figures 3 and 13. As shown in Figure 4 the side walls 25 of the slot 23 and side walls 26 of the slot 24 are respectively arranged in parallel relation. In the fabrication of the slot 23 there is fashioned centrally of the block a core formed with a substantially cylindrical surface 28 having its axis of generation BB shown in Figure 13 passing through the center of the block at right angles to the planes of the walls 25 of the slot or groove 23. The center portion of the block 10 forming the base of the groove 24 is of substantially cylindrical construction as shown at 29 in Figure 3 generated about the axis AA shown in Figure 13. The portions of the central cylindrical formations 28 and 29 at the juncture or intersection of the grooves 23 and 24 are machined or fashioned into flat parallel surfaces 31 for a purpose hereinafter explained. The curved exterior surfaces 42 on the block are generated about the axis CC shown in Figure 13.

Each of the yokes or yoke elements 11 and 12 in the embodiment illustrated are of identical construction. The yoke 11 is provided or formed with projecting arms or furcations 33 which are of a thickness to be slidably, yet snugly, received into the groove 23 formed in the center section 10. The projections or furcations 33 are fashioned with partial cylindrical interior surfaces 34, the radius of curvature of the surfaces 34 being of a dimension to snugly yet slidably fit the curved or cylindrical interior configuration 28 formed on the core 30 of the center section 10.

The other yoke 33' is of the same construction as the yoke 33. The furcations of both of the yoke constructions are provided with a space bounded by walls 36 to accommodate the furcations of the opposite yoke member during angular movements of the joint construction. The edge portions of the walls 36 are chamfered as at 37 and the extremities of the furcations 33 and 33' are chamfered as at 38 to allow for clearance of the furcations of the opposite yoke during angular movements of the joint.

I have devised a novel method of producing or fabricating the center block section 10 wherein the same may be inexpensively manufactured from a forging fashioned to the general configuration as shown in Figure 3 or machined from a solid block of metal. The formation of the finished block is accomplished by machining the parallel walls of the grooves 23 and 24, the cylindrical surfaces 28 and 29, and the curved exterior surfaces 42 of the block about three different axes of rotation or generation. In the first operation or step, the block is mounted between centers of a lathe or similar machine for rotation about the axis BB shown in Figure 13 and the flat parallel wall surfaces 23, the curved surface 28 of the core portion and the exterior curved surface 40 are formed at a single setting of the block by suitable form tools. The block is then reset in the lathe for rotation about the axis AA in right angular relation to the axis BB at which setting of the block the cylindrical surface 29 of the core, the flat parallel surfaces 24 and the exterior curved surfaces 41 are formed on the block. The block is then reset to rotate about the axis CC in right angular relation to the axes AA and BB of cylindrical surfaces 28 and 29, and the curved exterior surfaces 42 are formed or machined on the block. The surfaces and their relative relationship are illustrated in Figures 3 and 13. Through the utilization of the above described method, the center block section 10 may be quickly and easily manufactured on an ordinary turning lathe or similar equipment by conventional form tools. The flat surfaces 31 formed on the central cylindrical portions 28 and 29 may afterwards be milled or otherwise formed by conventional manufacturing methods.

In the formation of the projections or furcations 33 and 33' of the yoke elements, the width of the throats or entrances to the cylindrical configurations 34 are of a dimension to be slidably moved into embracing relation with the core at the zones of the parallel walls 31. In the assembly of the arrangement as shown in Figures 1 to 4 inclusive, one of the yoke members 11 while in the dotted position illustrated in Figures 2 and at 90° from its normal position is adapted to be slipped over the parallel flat surfaces 31 of the core 30 of the block 10 by moving the yoke in the direction of arrows indicated in Figure 2. After the assembly of the yoke member is had in which the arcuate or cylindrical surfaces 34 are coincident or in registration with the cylindrical surface 28, the yoke member 11 may then be swung through an angle of 90° in a clockwise direction as viewed in Figure 2 to the full line position as shown. The yoke member 13 is assembled in the groove formed by walls 24 of the center section 10 by following the same procedure so that the furcations 33' straddle or embrace the arcuate or cylindrical surfaces 29 of the core 30. As the curved surfaces of the pairs of furcations are in snug, yet slidable, relation with the curved surfaces of the core of the block or section 10, the yoke members 11 and 13 are thus securely held in operative assembly with the block 10 throughout all normal angular movements of the joint construction. I have found that the joint may be efficiently operated up to about 30 degrees either side of the aligned axis of the joint elements. While the universal joint of my invention does not result in a mathematically perfect constant velocity joint, I have found that the operation of the universal joint closely approximates the operation of a constant velocity joint and gives satisfactory operation for connecting angularly arranged driving and driven shafts or other machine elements. Furthermore due to the provision of ample bearing surfaces between the central section 10 and the furcations of the yoke elements, the wear of the elements is reduced to a minimum and hence the joint construction has exceptionally long life.

A modified form of my invention is illustrated in Figures 5 through 8 inclusive. In this form the yoke element 50 is formed in two halves designated 51 and 52 while the yoke element 53 is formed in two halves 54 and 55. The halves of each yoke construction are preferably held together by means of a shaft or rivet 56 passing through openings 57 formed in the yoke sections.

The central or connecting section 60 is formed in substantially the same manner as the section 10 shown in Figures 3 and 13 of the drawings except that the core or center portions of the section 60 are of complete cylindrical formation as shown at 28' and 29'. The yoke sections 51 and 52 are respectively provided with projections 61 and 62 which are formed with interior partial cylindrical surfaces 63 and 64 which embrace the cylindrical center section 28' as shown in Figure 5 when the parts are in assembled relation and the yokes 51 and 52 are secured together by means of a rivet 56. In the same manner, the yoke sections 54 and 55 are provided with projections 66 and 67 provided with interior cylindrical surfaces 68 which snugly, yet slidably, engage the cylindrical surface 29, of the center block or section 60. Thus when the yoke sections 54 and 55 are assembled together as shown in Figure 5 and held in assembled relationship by means of rivets 56, the several elements of the joint construction are thus held in operative relation, the yoke elements being interlocked with the core of the center section 60 prevent separation of the yoke elements 50 and 53 yet permitting substantial angular movement of yoke 50 relative to yoke 53. As in the form shown in Figure 1, this modification provides large bearing surfaces so that the joint construction is capable of long life with a minimum of wear. Furthermore the elements of the joint construction may be made by conventional methods, the center section 60 being fashioned in substantially the same manner as the center section 10 illustrated in Figures 3 and 13 but without the flat walls on the core portion.

Figures 9 through 12 inclusive illustrate a further modification of my invention wherein the yoke member 71 is integrally formed with furcations 72 and 73 having arcuate surfaces 74 which fit the cylindrical formation 29″ of the core in the center block 75, the latter being of substantially the same construction as section 60 shown in Figure 7. A cap member 77 has an arcuate surface 78 which also fits the cylindrical surface 29″. The cap 77 is secured to the projections 73 formed on yoke 71 by means of threaded screws 79. Thus the parts in assembled relation as shown in Figure 9 prevent disassembly of the yoke member 71 from the center section or block 75 by reason of the cap member 77.

The yoke member 80 is formed with projections 81 which are secured to a cap member 82 by means of screws 83. The inner walls of projections 81 and of cap 82 are formed with curved surfaces as shown in Figure 10 to snugly, yet slidably, engage and surround the surface 28″ of the center section 75 as shown in Figure 10. The complete joint construction is shown in assembled relation in Figure 9 and when the cap members 78 and 82 are in their assembled position as shown, the yoke members are capable of relative angular movement as in the other forms of the invention. This form of construction also provides large bearing surfaces and hence greatly minimizing the wear of the joint elements. The caps 77 and 82 are chamfered or relieved as at 85 to provide ample clearance for the parts when the yoke members are operating in out-of-aligned or angular relationship.

It is apparent that, within the scope of the invention, modifications and different arrangements may be made other than is herein disclosed, and the present disclosure is illustrative merely, the invention comprehending all variations thereof.

What I claim is:

In a joint construction, in combination, a removable center section, and a pair of similarly-shaped yoke elements, said center section being formed with a core and two peripheral grooves which intersect and which are disposed at right angles to each other and each of which has parallel, plane side walls, the bottom of each groove comprising two spaced diametrically opposed arcuate portions of a common cylindrical surface and two spaced, diametrically opposed flat parallel surfaces which connect said arcuate portions, the two flat parallel surfaces being common to the bottoms of both grooves and the arcuate portions of the two grooves being curved, respectively, about axes that are disposed at right angles to each other, the bottoms of the two grooves constituting the external surface of said core, and said center section having an external surface comprising two cylindrical portions coaxial, respectively, with the two axes of the bottoms of its peripheral grooves and a third cylindrical portion curved about an axis perpendicular to said two axes, and each of said yoke elements having a body portion, said body portion having a plane surface, said yoke elements having two spaced furcations projecting from said surface, the furcations of each yoke element having opposite plane side walls and opposed inside walls, said opposed inside walls being parallel and plane for the portion of their length adjacent the body portion of each yoke element and being arcuately curved and of arcuate cylindrical shape for the portion of their length adjoining said parallel plane portions, the furcations of one of said yoke elements straddling said core and engaging in one of said grooves, and the furcations of the other of said yoke elements straddling said core and engaging in the other of said grooves, the curved portions of the inside walls of the furcations of the two yoke elements matching substantially in curvature the arcuate cylindrical surfaces of the bottoms of their respective grooves and the parallel side surfaces of the furcations corresponding to and fitting, respectively, the parallel side walls of their respective grooves, the space between the furcations of each yoke element at the free ends of the furcations being at least as great as the width of said core measured across the parallel flat surfaces thereof but being less than the width of said core measured across diametrically opposite arcuate surfaces, and said furcations being chamfered at the junctures of their side walls with the plane portions of their inside walls to provide clearance for angular movement of one yoke element with respect to the other.

CLIFFORD L. GARRISON.

References Cited in the file of this patent

UNITED STATES PATENTS

| Number | Name | Date |
|---|---|---|
| 269,473 | Shay | Dec. 19, 1882 |
| 801,934 | Toney | Oct. 17, 1905 |
| 1,177,766 | Eden, Jr. | Apr. 4, 1916 |
| 1,304,758 | Fox | May 27, 1919 |
| 1,310,239 | Johnson | July 15, 1919 |
| 2,402,006 | Anderson | June 11, 1946 |